United States Patent [19]

Forgò et al.

[11] Patent Number: 4,612,209
[45] Date of Patent: Sep. 16, 1986

[54] PROCESS FOR THE PREPARATION OF HEAT-CURABLE ADHESIVE FILMS

[75] Inventors: Imre Forgò, Birsfelden; René Huwyler, Aesch, both of Switzerland; Jacques François, Huningue, France

[73] Assignee: Ciba-Geigy Corporation, Ardsley, N.Y.

[21] Appl. No.: 682,649

[22] Filed: Dec. 17, 1984

[30] Foreign Application Priority Data

Dec. 27, 1983 [CH] Switzerland ............... 6927/83

[51] Int. Cl.$^4$ .................... B05D 3/06; B05D 5/10
[52] U.S. Cl. ....................... 427/54.1; 427/208.2; 427/386
[58] Field of Search ............ 427/54.1, 386, 53.1, 427/208.2

[56] References Cited

U.S. PATENT DOCUMENTS

| | | | |
|---|---|---|---|
| 3,641,195 | 2/1972 | Ball et al. | 260/837 R |
| 4,092,443 | 5/1978 | Green | 427/53.1 |
| 4,440,802 | 4/1984 | Irving | 427/54.1 |

FOREIGN PATENT DOCUMENTS

| | | |
|---|---|---|
| 1552046 | 9/1979 | United Kingdom . |
| 2105726 | 3/1983 | United Kingdom . |
| 2109798 | 6/1983 | United Kingdom . |
| 2119810 | 11/1983 | United Kingdom . |

*Primary Examiner*—Michael R. Lusignan
*Attorney, Agent, or Firm*—Luther A. R. Hall

[57] ABSTRACT

Heat-curable adhesive films of variable tack can be prepared:

1. by coating a peelable release film or substrate with a liquid mixture of substances containing
   (a) 2-24% by weight of a photopolymerizable compound containing at least one grouping $CH_2=C(R)COO-$ in which R is a hydrogen atom or a methyl group,
   (b) 20-90% by weight of a heat-curable epoxide resin or mixture of epoxide resins containing no photopolymerizable groups,
   (c) a heat-activatable curing agent for epoxide resins,
   (d) 0.1 to 2% by weight of an accelerator,
   (e) 0.01 to 5% by weight of a photopolymerization catalyst for the component (a) and
   (f) if appropriate, further additives, the sum of the components (a) to (f) being 100% by weight,
2. by covering the layer, if necessary, with a reinforcing material and again coating with a mixture of substances according to 1, and
3. irradiating the layer thus obtained with actinic light.

14 Claims, No Drawings

PROCESS FOR THE PREPARATION OF HEAT-CURABLE ADHESIVE FILMS

The present invention relates to a novel process for the preparation of heat-curable adhesive films having a variable tack and to the heat-curable adhesive films obtainable by means of this process and to their use for bonding substrates.

For various applications, in particular for bonding substrates or articles composed of different materials or materials having a different surface quality, for example oily and non-oily metal surfaces or substrates consisting of wood and metals or of glass or ceramics and metals, adhesive films having a different tack, adjusted to suit the substrates to be bonded, on their two sides are desired.

It has been found that heat-curable adhesive films of variable tack can be prepared:

1. by coating a peelable release film or substrate with a liquid mixture of substances containing
   (a) 2-24% by weight of a photopolymerisable compound containing at least one grouping $CH_2=C(R)COO-$ in which R is a hydrogen atom or a methyl group,
   (b) 20-90% by weight of a heat-curable epoxide resin or mixture of epoxide resins containing no photopolymerisable groups,
   (c) a heat-activatable curing agent for epoxide resins,
   (d) 0.1 to 2% by weight of an accelerator,
   (e) 0.01 to 5% by weight of a photopolymerisation catalyst for the component (a) and
   (f) if appropriate, further additives, the sum of the components (a) to (f) being 100%, by weight
2. by covering the layer, if necessary, with a reinforcing material, for example a nonwoven, and again coating with a mixture of substances according to 1, and
3. irradiating the layer thus obtained with actinic light.

The operation 2 can also be carried out several times.

The process according to the invention makes it possible to prepare adhesive films of variable tack in a single stage, i.e. in one operation, in a very simple and economical manner and at relatively low temperatures, specifically, the side of the adhesive film supported by the release film is in general dry or less tacky than the side exposed directly to the irradiation with actinic light. It is then possible to bond substrates in a customary manner by heating, preferably to temperatures between 70° and 200° C., by means of the heat-curable adhesive films thus obtained. The desired tack can be adjusted easily by varying the content of component(s) (a) or by selecting specific components (a). The adhesive films prepared in accordance with the invention are also distinguished by good stability on storage and good resistance to cold/hot humidity. The tack of the films is not greatly dependent on the temperature and is retained even after prolonged storage.

If desired, the adhesive films obtained in accordance with the invention can be provided with a further heat-curable adhesive layer. Examples of adhesives suitable for this purpose are heat-curable epoxide resin systems, especially those of the type described in U.S. Pat. No. 3,641,195. These contain:

(i) an epoxide resin or mixture of epoxide resins which is dispersed, in a finely particulate form, in:
(ii) a thermoplastic copolymer formed from an α-olefin and an ether or ester of an α-olefin, and
(iii) a curing agent for the epoxide resin (i).

It is preferable to use ethylene/vinyl acetate or ethylene/ethyl acetate copolymers as the component (ii). Adhesive films which are dry to tacky on the side supported on the release film and are dry to tacky, depending on the nature of the epoxide resin system employed, on the other, open side, are obtained by means of this additional coating. The single-stage preparation of adhesive films, as described in the preceding text, is preferable. A suitable component (a) is, in particular, a compound of the formula I $$[CH_2=C(R)COO]_nX \qquad (I)$$

in which R is a hydrogen atom or a methyl group, n is an integer from 1 to 4 and, if n=1, X is alkyl having 1-12 C atoms, hydroxyalkyl having 1-4 C atoms, alkoxyalkyl having 2-8 C atoms,

cyclopentyl, cyclohexyl, phenyl, 2-furyl, 2-pyridyl or 3-pyridyl, or, if n=2, X is a group $-C_rH_{2r}-$ in which r=2–12, $-[CH_2CH_2O]_mCH_2CH_2-$ in which m=1, 2 or 3 or

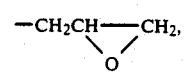

if n=3, X is

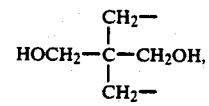

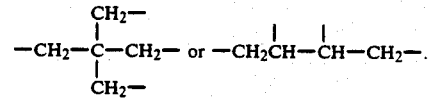

Alkyl, hydroxyalkyl, alkoxyalkyl and alkenyl groups X can be linear or branched. When X is an alkyl group it has, in particular, 1-8 C atoms, especially 1-4 C atoms. Hydroxyalkyl groups X preferably have 2 or 3 C atoms, and preferred alkoxyalkyl groups X are those having 2-6 C atoms. The following are examples of suitable alkyl, hydroxyalkyl and alkoxyalkyl groups X: methyl, ethyl, n-propyl, isopropyl, butyl, isobutyl, n-pentyl, n-hexyl, 2-ethylhexyl, n-octyl, n-decyl and n-dodecyl; hydroxymethyl, 2-hydroxyethyl, 2-hydroxypropyl or 3-hydroxypropyl; and ethoxymethyl, 2-methoxyethyl, 2-ethoxyethyl, 3-methoxypropyl and 3-ethoxypropyl.

Groups $-C_rH_{2r}-$ can also be linear or branched. r is preferably 2-6. Groups $-(CH_2)_r-$ in which r=2-6 are particularly preferred.

The following may be mentioned as examples of compounds of the formula I: methyl, ethyl, n-propyl, n-butyl, isobutyl, n-hexyl, 2-ethylhexyl, n-octyl, n-decyl and n-dodecyl acrylate, methyl, ethyl, n-propyl, n-butyl, isobutyl, n-hexyl, 2-ethylhexyl, n-octyl, n-decyl and n-dodecyl methacrylate, 2-hydroxyethyl, 2-hydroxypropyl and 3-hydroxypropyl acrylate, 2-hydroxyethyl, 2-hydroxypropyl and 3-hydroxypropyl methacrylate, 2-methoxyethyl, 2-ethoxyethyl and 2-ethoxypropyl or 3-ethoxypropyl acrylate, 2-methoxyethyl, 2-ethoxyethyl and 2-ethoxypropyl or 3-ethoxypropyl methacrylate, allyl acrylate and allyl methacrylate, glycidyl acrylate and glycidyl methacrylate, cyclopentyl and cyclohexyl acrylate, cyclopentyl and cyclohexyl methacrylate, phenyl acrylate and phenyl methacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, 1,1,1-trimethylolethane triacrylate, 1,1,1-trimethylolethane trimethacrylate, 1,1,1-trimethylolpropane triacrylate, 1,1,1-trimethylolpropane trimethacrylate, glycerol triacrylate, glycerol trimethacrylate, pentaerythritol diacrylate, pentaerythritol dimethacrylate, pentaerythritol triacrylate, pentaerythritol trimethacrylate, pentaerythritol tetraacrylate and pentaerythritol tetramethacrylate, 1,3-butanediol diacrylate, 1,3-butanediol dimethacrylate, 1,4-butanediol diacrylate, 1,4-butanediol dimethacrylate, 1,6-hexanediol diacrylate, 1,6-hexanediol dimethacrylate, 1,3-propanediol diacrylate, 1,3-propanediol dimethacrylate, 1,8-octanediol diacrylate, 1,8-octanediol dimethacrylate, 1,12-dodecanediol diacrylate and 1,12-dodecanedioldimethacrylate.

It is also possible to employ mixtures of different components (a).

It is preferable to employ as the component (a) compounds of the formula I in which R is a hydrogen atom or a methyl group, n is an integer from 1 to 4 and, if n=1, X is hydroxyalkyl having 2 or 3 C atoms or alkoxyalkyl having 2-6 atoms, if n=2, X is a group —(CH$_2$)$_r$— in which r=2-6, —CH$_2$CH$_2$OCH$_2$CH$_2$— or

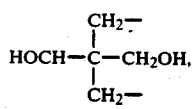

if n=3, X is

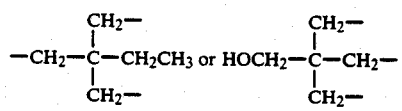

and, if n=4, X is

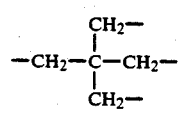

or mixtures of the said compounds.

It is particularly preferable to use as the component (a) ethylene glycol dimethacrylate, 1,4-butanediol diacrylate or 1,4-butanediol dimethacrylate, 1,6-hexanediol diacrylate or 1,6-hexanediol dimethacrylate, 2-hydroxyethyl, 2-hydroxypropyl or 3-hydroxypropyl diacrylate or 2-hydroxyethyl, 2-hydroxypropyl or 3-hydroxypropyl dimethacrylate, 2-methoxyethyl acrylate, 2-methoxyethyl methacrylate, 2-ethoxyethyl acrylate or 2-ethoxyethyl methacrylate, 1,1,1-trimethylolpropane triacrylate or 1,1,1-trimethylolpropane trimethacrylate, pentaerythritol triacrylate or pentaerythritol trimethacrylate or mixtures thereof.

The component (a) is preferably employed in an amount of 4–20, especially 4–15, % by weight, based on all the components (a) to (f).

Suitable epoxide resins (b) or (i) are, in particular, those having on average more than one group of the formula II

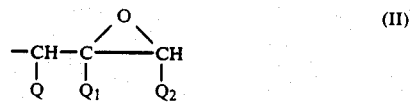

which is attached to a hetero-atom, for example to an S atom and preferably to an O or N atom, Q and Q$_2$ each being a hydrogen atom and Q$_1$ being a hydrogen atom or a methyl group or Q and Q$_2$ together being —CH$_2$CH$_2$— or —CH$_2$CH$_2$CH$_2$— and Q$_1$ being a hydrogen atom.

Examples of such resins which may be mentioned are polyglycidyl and poly-(β-methylglycidyl) esters derived from aliphatic, cycloaliphatic or aromatic polycarboxylic acids. Examples of suitable polycarboxylic acids are succinic acid, glutaric acid, adipic acid, pimelic acid, suberic acid, azelaic acid, sebacic acid, dimerised or trimerised linoleic acid, tetrahydrophthalic acid, 4-methyltetrahydrophthalic acid, hexahydrophthalic acid, 4-methylhexahydrophthalic acid, phthalic acid, isophthalic acid and terephthalic acid.

Further examples are polyglycidyl and poly-(β-methylglycidyl) ethers which are obtained by reacting a compound containing at least two alcoholic and/or phenolic hydroxyl groups per molecule with epichlorohydrin or with allyl chloride and subsequently epoxidising the product with per-acids.

Examples of suitable polyols are ethylene glycol, diethylene glycol, poly-(oxyethylene) glycols, 1,2-propanediol, poly-(oxypropylene) glycols, 1,3-propanediol, 1,4-butanediol, poly-(oxytetramethylene) glycols, 1,5-pentanediol, 2,4,6-hexanetriol, glycerol, 1,1,1-trimethylolpropane, pentaerythritol and sorbitol; resorcitol, quinitol, bis-(4-hydroxycyclohexyl)-methane, 2,2-bis-(4-hydroxycyclohexyl)-propane and 1,1-bis-(hydroxymethyl)-cyclohex-3-ene; N,N-bis-(2-hydroxyethyl)-aniline and 4,4'-bis-(2-hydroxyethylamino)-diphenylmethane; resorcinol, hydroquinone, bis-(4-hydroxyphenyl)-methane (bisphenol F), 2,2-bis-(4-hydroxyphenyl)-propane (bisphenol A), 2,2-bis-(4-hydroxy-3,5-dibromophenyl)-propane (tetrabromobisphenol A), 1,1,2,2-tetrakis-(4-hydroxyphenyl)-ethane, 4,4'-dihydroxybiphenyl, bis-(4-hydroxyphenyl) sulfone and novolaks formed from formaldehyde or acetaldehyde and phenol, chlorophenol or alkylphenols having up to 9 C atoms in the alkyl group, in particular cresol and phenol novolaks.

Suitable poly-(N-glycidyl) compounds are products obtained by dehydrochlorination of reaction products formed from epichlorohydrin and amines having at least 2 amine hydrogen atoms. Examples of suitable amines are aniline, n-butylamine, bis-(4-aminophenyl)-methane, 1,3-xylylenediamine and 1,4-xylylenediamine, 1,3-bis-(aminomethyl)-cyclohexane and 1,4-bis-(aminomethyl)-cyclohexane and bis-(4-methylaminophenyl)-methane. Triglycidyl isocyanurate, N,N'-diglycidyl derivatives of cyclic alkyleneureas, such as ethyleneurea and 1,3-propyleneurea, or hydantoins, such as 5,5-dimethylhydantoin, are further suitable compounds of this type.

Examples of poly-(S-glycidyl) compounds are the di-S-glycidyl derivatives of dithiols, such as ethanol-1,2-dithiol and bis-(4-mercaptomethylphenyl) ether.

Examples of epoxide resins having one or more groups of the formula II in which Q and $Q_2$ together are a group —$CH_2CH_2$— or —$CH_2CH_2CH_2$— are bis-(2,3-epoxycyclopentyl) ether, 2,3-epoxycyclopentyl glycidyl ether, 1,2-bis-(2,3-epoxycyclopentyloxy)-ethane, 3,4-epoxy-6-methylcyclohexylmethyl 3', 4'-epoxy-6'-methylcyclohexanecarboxylate and 2-(3,4-epoxy)-cyclohexyl-5,5-spiro-(3', 4'-epoxy)-cyclohexanedioxane.

It is also possible to employ epoxide resins in which the epoxide groups are attached to hetero-atoms of different types or in which some or all of the epoxide groups are non-terminal, for example the N,N,O-triglycidyl derivative of 4-aminophenol, N-glycidyl-N'-(2-glycidyloxypropyl)-5,5-dimethylthydantoin, vinylcyclohexene dioxide, limonene dioxide and dicyclopentadiene dioxide.

The epoxide resins (b) or (i) can be solid or liquid. It is preferable to use, as the component (b), liquid epoxide resins or mixtures of liquid and solid epoxide resins. The proportion of liquid epoxide resins in the component (b) is preferably at least 30% by weight and especially at least 50% by weight, based on the total amount of resins (b) present. Liquid epoxide resins which are used advantageously are those having an epoxide content of 3.5 to 7.0 equivalents/kg, whereas preferred solid epoxide resins are those having an epoxide content of 0.5 to 2.9 equivalents/kg.

The component (b) is preferably employed in an amount of 30 to 90% by weight.

It is particularly preferable to employ, as the component (b), diglycidyl ethers, which can be so-called advanced, of dihydric phenols, in particular 2,2-bis-(4-hydroxyphenyl)-propane, 2,2-bis-(3,5-dibromo-4-hydroxyphenyl)-propane, bis-(4-hydroxyphenyl)-methane, bis-(4-hydroxycyclohexyl)-methane or 2,2-bis-(4-hydroxycyclohexyl)propane, polyglycidyl ethers of novolaks or tetraglycidylated 4,4'-diaminodiphenylmethane. Diglycidyl ethers, which can be so-called advanced, of bisphenol A, tetrabromobisphenol A or bisphenol F, polyglycidyl ethers of phenol-formaldehyde or cresol-formaldehyde novolaks or mixtures thereof are very particularly preferred.

The epoxide resins (b) can be mixed with a reactive diluent, for example phenyl or cresyl glycidyl ether, butanediol diglycidyl ether, hexahydrophthalic acid diglycidyl ether or glycidyl esters of synthetic, highly branched and mainly tertiary, aliphatic monocarboxylic acids, known by the name "CARDURA E", preferably in an amount of 3–50% by weight, based on the total amount of epoxide resins.

Heat-activatable curing agents (c) which can be employed are compounds known per se, for example aromatic polyamines having at least 3 amine hydrogen atoms per molecule, such as p-phenylenediamine and m-phenylenediamine, bis-(p-aminophenyl)-methane and bis-(p-aminophenyl) ether; polycarboxylic anhydrides, such as phthalic anhydride, tetrahydrophthalic anhydride, hexahydrophthalic anhydride, trimellitic anhydride and pyromellitic dianhydride; cyanamide, dicyandiamide, complexes of amines, such as ethylamine and trimethylamine, with boron trifluoride and boron trichloride; melamines, N,N-diallylmelamines, phthalimides and polyhydrazides, such as isophthalic acid dihydrazide, adipic acid dihydrazide and sebacic acid dihydrazide.

Dicyandiamide is preferably used as the curing agent. The curing agent (c) is employed in an amount adequate to cure the epoxide resins. Anhydride and amine curing agents are preferably used in an amount such that 0.7 to 1.2 anhydride or amine hydrogen equivalents are present per equivalent of epoxide group of the epoxide resin.

Suitable accelerators (d) are, in particular, compounds of the formula III

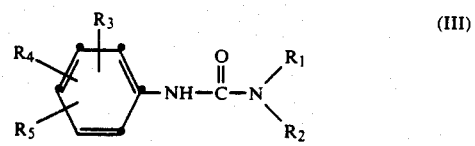

in which $R_1$ and $R_2$ independently of one another are alkyl having 1–4 C atoms, $R_3$ and $R_4$ independently of one another are a hydrogen atom or a halogen atom, alkyl or alkoxy having 1–4 C atoms, phenyl or phenoxy, and $R_5$ is a hydrogen atom or —$CF_3$. $R_1$ and $R_2$ are preferably each methyl or ethyl, and $R_3$ and $R_4$ independently of one another are preferably a hydrogen, chlorine or bromine atom or alkyl or alkoxy having 1–4, and especially 1 or 2, C atoms. Suitable compounds of the formula III are, in particular, N-4-trifluoromethylphenyl-N', N'-dimethylurea, N-4-chlorophenyl-N', N'-dimethylurea (monuron), N-4-ethoxyphenyl-N',N'-dimethylurea and, in particular, N-3-chloro-4-methylphenyl-N',N'-dimethylurea (chlortoluron). Other suitable accelerators (d) are imidazoles, such as benzimidazole, 2-ethyl-4-methylimidazole and 2-phenylimidazole, and tertiary amines, such as benzyldimethylamine and hexamethylenetetraamine.

The accelerator (d) is preferably used in an amount of 0.1 to 1.0 % by weight. Chlortoluron is particularly preferable as the accelerator.

Suitable photopolymerisation catalysts (e) are, in principle, two classes of compounds: those which, when irradiated, produce an activated state leading to the formation of free radicals, which then initiate the polymerisation of the compound (a) (photoinitiators) and those which, when irradiated, produce an activated state which, in turn, transfers its activation energy to a monomer molecule, so that an activated monomer molecule is formed and this then crosslinks with a non-activated monomer molecule (photosensitisers).

Suitable photopolymerisation catalysts are described, for example, in German Offenlegungsschrift No. 2,706,549. It is preferable to use 0.02 to 1.0% by weight of the photopolymerisation catalyst, in particular benzil dimethyl ketal.

The mixture of substances to be used in accordance with the invention can contain further customary additives (f), for example pigments or carbon black, and, in particular, inorganic fillers, such as glass, quartz powder, calcium carbonate, wollastonite, dolomite, kaolin, talc and the like, surface-active substances or elastomers, in particular acrylonitrile/butadiene elastomers.

The proportion of further additives (f) can be up to 65% by weight, based on the totality of the components (a) to (f). Inorganic fillers, especially calcium carbonate and wollastonite, are expediently used in amounts of 10-60% by weight. This makes it possible to reduce correspondingly the proportion of the remaining components, in particular the resins (b) and especially the solid epoxide resins.

The coating of the release films can be carried out at relatively low temperatures, expediently at temperatures between 50° and 70° C. Examples of suitable reinforcing materials are glass fibre nonwovens, cotton nonwovens and especially polyester nonwovens.

Peelable release films or substrates which can be used in the process according to the invention are customary materials, for example release films composed of polyethylene or polyester or of cellulose-containing paper having a silicone coating (so-called silicone paper).

It is preferable to use actinic radiation of a wavelength of 200-600 nm, particularly UV irradiation, for the photopolymerisation. Suitable sources of actinic radiation are, inter alia, carbon arcs, mercury vapour lamps, metal halide vapour lamps, fluorescent tubes containing luminescent substances which emit ultraviolet light, argon and xenon glow-discharge lamps, tungsten lamps and photographic floodlights. The time required for the exposure of the photopolymerisable compounds can vary as a function of the nature and amount of the components (a) to (f) used, the nature of the light source and the distance of the latter from the coated release film. The coating must in any case still be heat-curable after the photopolymerisation; for this reason the photopolymerisation is carried out at temperatures below those at which the curing by heat is carried out in the presence of the heat-activatable curing agent.

Suitable components (i), (ii) and (iii) for the possible application of an additional heat-curable adhesive layer, including preferred embodiments, are described in U.S. Pat. No. 3,641,195. The relevant contents of this patent specification are therefore a part of the present invention.

The adhesive films obtained in accordance with the invention are suitable for bonding various substrates, such as glass, ceramics, porcelain, plastics, wood and metals and especially for bonding oily and non-oily metal substrates, for example those composed of aluminium, copper or steel.

The bonding (curing by heat) is generally carried out at temperatures between 70° and 200° C., especially 120° to 180° C.

The process according to the invention is illustrated by means of the examples which follow. The following are used as resins (b):
Liquid epoxide resins Resin I: a liquid epoxide resin based on bisphenol A and epichlorohydrin and having an epoxide content of 5.35 equivalents/kg.

Resin II: a liquid epoxide resin based on bisphenol A and epichlorohydrin and having an epoxide content of 4.6 equivalents/kg.

Resin III: a liquid epoxide/phenol/novolak resin having an epoxide content of 5.4 equivalents/kg.
Solid epoxide resins Resin A: a solid, so-called advanced epoxide resin based on bisphenol A and epichlorohydrin and having an epoxide content of 2.45-2.85 equivalents/kg.

Resin B: a solid, so-called advanced epoxide resin based on bisphenol A and epichlorohydrin and having an epoxide content of 0.38 equivalents/kg.

Resin C: a solid, so-called advanced epoxide resin based on bisphenol A and epichlorohydrin and having an epoxide content of 0.45 equivalents/kg.

Resin D: a solid, so-called advanced epoxide resin based on bisphenol A and epichlorohydrin and having an epoxide content of 0.55 equivalents/kg.

EXAMPLES 1-21:

The components (b) and, if appropriate, further additives present (liquid polymer, fillers or surfaceactive agent) are homogenised in a mixing vessel at 150°-170° C. The resulting mixture is cooled to 80° C. and mixed with the curing agent (c). After being cooled further to 60° C., the components (a) (acrylate), the accelerator (d) and the photopolymerisation catalyst (e) are added. A homogeneous emulsion is formed after stirring for 10 minutes.

The mixture thus obtained is kept at 60° C. and applied to a silicone paper (100×10 mm) (layer thickness approx. 0.15 mm). A polyester nonwoven (layer thickness 0.1 mm) is then placed on the layer and kept at 60° C. for 1 minute, whereby the nonwoven penetrates into the layer. A further layer of the above mixture is then applied (layer thickness approx. 0.15 mm). The resulting film is exposed for 3 minutes using a metal halide copying lamp ("Ultralux 5,000 K" made by W. Staub, Neu-Isenburg, West Germany).

The tensile shear strength is determined by applying the films to oily steel sheets and curing them for 30 minutes at 180° C. The compositions and properties of the resulting adhesive films are summarised in Table I below. The quantities are quoted in % by weight.

EXAMPLES 22-29:

The process according to Examples 1-21 is repeated, but without concomitantly using a polyester nonwoven. Accordingly, only a single coating results (layer thickness approx. 0.15 mm). The tack and the tensile shear strength are tested as described in Examples 1-21.

The compositions and properties of the resulting adhesive films are summarised in Table I below. The quantities are quoted in % by weight.

EXAMPLES 30-45:

The adhesive films obtained in accordance with Examples 1-8 are provided with a dry or tacky layer (layer thickness 0.1-0.6 mm). The following compositions are used to prepare this upper layer:

EXAMPLES 30-37:

dry upper layer)

| | |
|---|---|
| resin I | 35.93% by weight |
| resin A | 25.12% by weight |
| dicyandiamide | 3.05% by weight |
| chlortoluron | 0.36% by weight |
| calcium carbonate | 20.55% by weight |
| blue pigment | 0.15% by weight |
| ethylene/vinyl acetate elastomer (Elvax P 40 ® made by DuPont) | 12.56% by weight |
| adhesion promoter (γ-glycidyloxypropyltrimethoxysilane) | 1.02% by weight |
| thixotropic agent (Silodex 24 ® made by Grace) | 1.26% by weight |

EXAMPLES 38–45:

(tacky upper layer)

| | |
|---|---|
| resin I | 51.99% by weight |
| resin A | 27.05% by weight |
| dicyandiamide | 4.16% by weight |
| chlortoluron | 0.53% by weight |
| calcium carbonate | 5.30% by weight |
| blue pigment | 0.36% by weight |

-continued

| | |
|---|---|
| ethylene/vinyl acetate elastomer (Elvax P 40 ® made by DuPont) | 8.21% by weight |
| adhesion promoter (γ-glycidyloxypropyltrimethoxysilane) | 0.74% by weight |
| thixotropic agent (Silodex 24 ® made by Grace) | 1.66% by weight |

The properties of the adhesive films obtained are summarised in Table I below.

TABLE 1

| | Components | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| (a) | 1,4-butanediol dimethacrylate | 6.31 | 11.88 | 16.82 | 21.22 | 4.97 | 9.51 | 13.61 | 6.45 | 4.20 | 7.65 | 11.99 | 2.05 | 5.56 | 11.80 | 11.98 | |
| | 1,6-hexanediol diacrylate | | | | | | | | | | | | | | | | 13 |
| | 2-hydroxyethyl methacrylate | | | | | | | | | | | | | | 11.80 | | |
| | 1,1,1-trimethylolpropane trimethacrylate | | | | | | | | | | | | | | | | |
| | 2-ethoxyethyl methacrylate | | | | | | | | | | | | | | | 11.97 | |
| (b) | resin I | 56.84 | 53.44 | 50.41 | 47.70 | 44.97 | 42.80 | 40.83 | 25.39 | 36.14 | 27.91 | 18.05 | 31.64 | 28.67 | 36.09 | 35.90 | |
| | resin II | | | | | | | | | | | | | | | | 56.77 |
| | resin III | | | | | | | | | | | | | | | | |
| | resin A | | | | | 30.89 | 29.40 | 28.05 | 44.74 | 24.90 | 19.24 | 12.44 | | | 24.69 | 24.66 | |
| | resin B | | | | | | | | | | | | | | | | 11 |
| | resin C | | | | | | | | | | | | | | | | |
| | resin D | 31.53 | 29.63 | 27.96 | 26.46 | 13.95 | 13.28 | 12.67 | | 11.24 | 8.68 | 5.61 | | | 11.15 | 11.14 | |
| (c) | dicyandiamide | 4.81 | 4.52 | 4.26 | 4.04 | 4.69 | 4.46 | 4.26 | 3.23 | 3.94 | 3.04 | 1.97 | 5.58 | 5.06 | 3.75 | 3.74 | |
| | trimellitic anhydride | | | | | | | | | | | | | | | | 19 |
| (d) | chlortoluron[2] | 0.44 | 0.41 | 0.39 | 0.37 | 0.48 | 0.46 | 0.44 | 0.43 | 0.45 | 0.35 | 0.23 | 0.71 | 0.65 | 0.48 | 0.38 | |
| | benzimidazole | | | | | | | | | | | | | | | | 0.1 |
| (e) | benzil dimethyl ketal | 0.07 | 0.12 | 0.16 | 0.21 | 0.05 | 0.09 | 0.14 | 0.06 | 0.04 | 0.07 | 0.12 | 0.02 | 0.06 | 0.24 | 0.23 | 0.13 |
| (f) | calcium carbonate[1] | | | | | | | | | | 19.09 | 33.06 | 49.59 | 60.00 | 60.00 | | |
| | wollastonite | | | | | | | | | | | | | | | | |
| | liquid polymer[5] | | | | | | | | 16.13 | | | | | | | | |
| | d-limonene[6] | | | | | | | | 3.57 | | | | | | | | |
| | 1:1 mixture of resin I + dicyandiamide | | | | | | | | | | | | | | | | |
| | 6:4 mixture of resin I + chlortoluron | | | | | | | | | | | | | | | | |
| | Appearance of the films after 3 minutes/UV | | | | | | | | | | | | | | | | |
| | above[3] | + | + | + | + | + | + | + | + | + | + | + | + | + | + | + | + |
| | below[4] | 1.+ | − | − | − | + | 1.+ | 1.+ | + | + | 1.+ | − | − | − | − | − | 1.+ |
| | tensile shear strength, N/mm² | 17 | 16 | 14 | 13 | 16 | n.d. | n.d. | 24.0 | 16.0 | 14.0 | 9.0 | n.d. | n.d. | n.d. | n.d. | 11 |

| | Components | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|
| (a) | 1,4-butanediol dimethacrylate | | | | | | 6.31 | 11.88 | 16.82 | 21.22 | 4.97 | 9.51 | 13.61 | 6.45 | 6.31 | 11.88 | 16.82 |
| | 1,6-hexanediol diacrylate | 13 | 13 | 13.02 | 11.42 | 9.87 | | | | | | | | | | | |
| | 2-hydroxyethyl methacrylate | | | | | | | | | | | | | | | | |
| | 1,1,1-trimethylolpropane trimethacrylate | | | | | | | | | | | | | | | | |
| | 2-ethoxyethyl methacrylate | | | | | | | | | | | | | | | | |
| (b) | resin I | | | | | | 56.84 | 53.44 | 50.41 | 47.70 | 44.97 | 42.80 | 40.83 | 25.39 | 56.84 | 53.44 | 50.41 |
| | resin II | | | 60.90 | 63.23 | 54.60 | | | | | | | | | | | |
| | resin III | 54.22 | 74.81 | 13.48 | | | | | | | | | | | | | |
| | resin A | | | | | | | | | | 30.89 | 29.40 | 28.05 | 44.74 | | | |
| | resin B | | | | | | | | | | | | | | | | |
| | resin C | 10.84 | | | | | | | | | | | | | | | |
| | resin D | | | | | | 31.53 | 29.63 | 27.96 | 26.46 | 13.95 | 13.28 | 12.67 | | 31.53 | 29.63 | 27.96 |
| (c) | dicyandiamide | | | | | | 4.81 | 4.52 | 4.26 | 4.04 | 4.69 | 4.46 | 4.26 | 3.23 | 4.81 | 4.52 | 4.26 |
| | trimellitic anhydride | 11.87 | | | | | | | | | | | | | | | |
| (d) | chlortoluron[2] | 21.70 | 0.19 | | | | 0.44 | 0.41 | 0.39 | 0.37 | 0.48 | 0.46 | 0.44 | 0.43 | 0.44 | 0.41 | 0.39 |
| | benzimidazole | 0.11 | 0.13 | 0.13 | 0.11 | 0.09 | | | | | | | | | | | |
| (e) | benzil dimethyl ketal | 0.13 | | | | | 0.07 | 0.12 | 0.16 | 0.21 | 0.05 | 0.09 | 0.14 | 0.06 | 0.07 | 0.12 | 0.16 |
| (f) | calcium carbonate[1] | | | | 12.32 | 24.24 | | | | | | | | | | | |

TABLE 1-continued

| | | | | | | | | | | | | | | | | | |
|---|---|---|---|---|---|---|---|---|---|---|---|---|---|---|---|---|---|
| wollastonite | | | | | | | | | | | | | | | | | |
| liquid polymer[5] | | | | | | | | | | | | | | 16.13 | | | |
| d-limonene[6] | | | | | | | | | | | | | | 3.57 | | | |
| 1:1 mixture of resin I + dicyandiamide | 10.92 | 11.32 | 9.80 | | | | | | | | | | | | | | |
| 6:4 mixture of resin I + chlortoluron | 1.55 | 1.60 | 1.40 | | | | | | | | | | | | | | |
| Appearance of the films after 3 minutes/UV | | | | | | | | | | | | | | | | | |
| above[3] | + | + | + | + | + | + | + | + | + | + | + | + | + | − | − | − | |
| below[4] | − | − | l.+ | l.+ | l.+ | + | + | l.+ | − | + | l.+ | l.+ | + | + | + | l.+ | |
| tensile shear strength, N/mm² | 13 | 8 | 13 | 14 | 13 | 16 | 15 | 14 | 13 | 16 | n.d. | n.d. | 24.0 | 17 | 16 | 16 | |

| | | | Example No. | | | | | | | | | | |
|---|---|---|---|---|---|---|---|---|---|---|---|---|---|
| | Components | 33 | 34 | 35 | 36 | 37 | 38 | 39 | 40 | 41 | 42 | 43 | 44 | 45 |
| (a) | 1,4-butanediol dimethacrylate | 21.22 | 4.97 | 9.51 | 13.61 | 6.45 | 6.31 | 11.88 | 16.82 | 21.22 | 4.97 | 9.51 | 13.61 | 6.45 |
| | 1,6-hexanediol diacrylate | | | | | | | | | | | | | |
| | 2-hydroxyethyl methacrylate | | | | | | | | | | | | | |
| | 1,1,1-trimethylol-propane trimethacrylate | | | | | | | | | | | | | |
| | 2-ethoxyethyl methacrylate | | | | | | | | | | | | | |
| (b) | resin I | 47.70 | 44.97 | 42.80 | 40.83 | 25.39 | 56.84 | 53.44 | 50.41 | 47.70 | 44.97 | 42.80 | 40.83 | 25.39 |
| | resin II | | | | | | | | | | | | | |
| | resin III | | | | | | | | | | | | | |
| | resin A | | 30.89 | 29.40 | 28.05 | 44.74 | | | | | 30.89 | 29.40 | 28.05 | 44.74 |
| | resin B | | | | | | | | | | | | | |
| | resin C | | | | | | | | | | | | | |
| | resin D | 26.46 | 13.95 | 13.28 | 12.67 | | 31.53 | 29.63 | 27.96 | 26.46 | 13.95 | 13.28 | 12.67 | |
| (c) | dicyandiamide | 4.04 | 4.69 | 4.46 | 4.26 | 3.23 | 4.81 | 4.52 | 4.26 | 4.04 | 4.69 | 4.46 | 4.26 | 3.23 |
| | trimellitic anhydride | | | | | | | | | | | | | |
| (d) | chlortoluron[2] | 0.37 | 0.48 | 0.46 | 0.44 | 0.43 | 0.44 | 0.41 | 0.39 | 0.37 | 0.48 | 0.46 | 0.44 | 0.43 |
| | benzimidazole | | | | | | | | | | | | | |
| (e) | benzil dimethyl ketal | 0.21 | 0.05 | 0.09 | 0.14 | 0.06 | 0.07 | 0.12 | 0.16 | 0.21 | 0.05 | 0.09 | 0.14 | 0.06 |
| (f) | calcium carbonate[1] | | | | | | | | | | | | | |
| | wollastonite | | | | | | | | | | | | | |
| | liquid polymer[5] | | | | | 16.13 | | | | | | | | 16.13 |
| | d-limonene[6] | | | | | 3.57 | | | | | | | | 3.57 |
| | 1:1 mixture of resin I + dicyandiamide | | | | | | | | | | | | | |
| | 6:4 mixture of resin I + chlortoluron | | | | | | | | | | | | | |
| | Appearance of the films after 3 minutes/UV | | | | | | | | | | | | | |
| | above[3] | − | − | − | − | − | + | + | + | + | + | + | + | + |
| | below[4] | − | + | l.+ | l.+ | + | + | + | l.+ | − | + | l.+ | l.+ | + |
| | tensile shear strength, N/mm² | 16 | 16 | n.d. | n.d. | 16.0 | 17 | 17 | 15 | 14 | 17 | n.d. | n.d. | 22.0 |

[1]"Durcal S" made by Plüss + Staufer AG

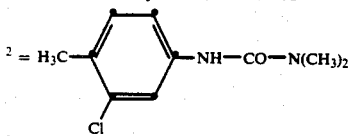

[2] =

[3,4] + = tacky, l.+ = less tacky − = dry
[5]acrylonitrile/butadiene copolymer "HYCAR CTBN" made by B. F. Goodrich Co.
[6]surface-active agent
n.d. = not determined.

The formulations to be used in accordance with the invention have a very good resistance to cold/hot humidity. Tensile shear strength samples composed of oily steel are bonded with the formulations according to Examples 1–5, cured and subjected to a cycle consisting of: 7 days at 80° C. and 100% relative humidity (steam bath), 1 day at −40° C. The tensile shear strength values (TSS values) are evaluated before and after the cycle:

TSS (initial value): 13–17 N/mm², after an 8-day cycle: 10–13 N/mm².

The tack of the films is not greatly dependent on the temperature. Particularly at low temperatures (for example at 10° C.), the formulations according to Examples 1–3, for example, do not lose their tack (see Table II).

TABLE II

| | | | Example No | | |
|---|---|---|---|---|---|
| Impact test on oily steel | | | 1 | 2 | 3 |
| at 20° C. | film side | above | + | + | + |
| | | below | + | + | − |
| at 10° C. | film side | above | + | + | + |
| | | below | + | − | − |

It is also found that the tack is not lost even after storage. The tack is determined by means of the impact test: the adhesive film (100×10 mm) is stored at various temperatures (10° C., 20° C.) and is then applied at these temperatures to an oily steel sheet by means of light finger pressure and is subsequently knocked against a hard foundation (wrought iron). The film should not slip off when knocked.

What is claimed is:

1. A process for the preparation of heat-curable adhesive films of variable tack, which consist essentially of
   coating a peelable release film or substrate with a liquid mixture of substances containing
   (a) 2–24% by weight of a photopolymerisable compound containing at least one grouping $CH_2=C(R)COO-$ in which R is a hydrogen atom or a methyl group,
   (b) 20–90% by weight of a heat-curable epoxide resin or mixture of epoxide resins containing no photopolymerisable groups,
   (c) a heat-activatable curing agent for epoxide resins,
   (d) 0.1 to 2% by weight of an accelerator,
   (e) 0.01 to 5% by weight of a photopolymerisation catalyst for the component (a),
   the sum of the components (a) to (e) being 100% by weight,
   covering the layer, if appropriate, with a reinforcing material and coating it again with a mixture of substances according to the first step, and
   irradiating the layer thus obtained with actinic light.

2. A process according to claim 1, wherein compounds of the formula I $$[CH_2=C(R)COO]_n X \quad (I)$$

in which R is a hydrogen atom or a methyl group, n is an integer from 1 to 4 and, if n=1, X is alkyl having 1–12 C atoms, hydroxyalkyl having 1–4 C atoms, alkoxyalkyl having 2–8 C atoms,

cyclopentyl, cyclohexyl, phenyl, 2-furyl, 2-pyridyl or 3-pyridyl, or, if n=2, X is a group $-C_rH_{2r}-$ in which r=2–12, $-[CH_2CH_2O]_m CH_2CH_2-$ in which m=1, 2 or 3 or

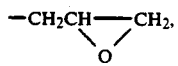

if n=3, X is

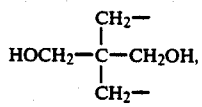

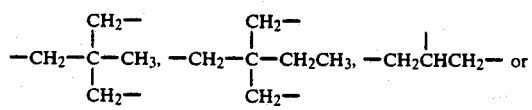

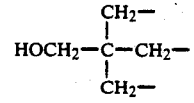

and, if n =4, X is a group

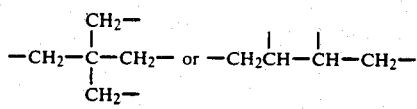

are used as the component (a).

3. A process as claimed in claim 2, wherein a compound of the formula I in which R is a hydrogen atom or a methyl group, n is an integer from 1 to 4 and, if n=1, X is hydroxyalkyl having 2 or 3 C atoms or alkoxyalkyl having 2–6 C atoms, if n=2 X is a group $-(CH_2)_r-$ in which r=2–6 or $-CH_2CH_2OCH_2CH_2-$ or

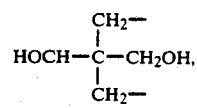

if n=3 X is

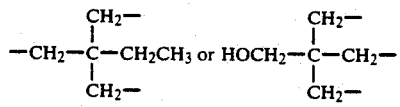

and, if n=4, X is

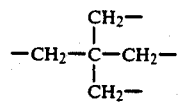

or mixtures of the said compounds are used.

4. A process according to claim 1, wherein ethylene glycol dimethacrylate, 1,4-butanediol diacrylate or 1,4-butanediol dimethacrylate, 1,6-hexanediol diacrylate or 1,6-hexanediol dimethacrylate, 2-hydroxyethyl diacrylate, 2-hydroxyethyl dimethacrylate, 2-hydroxypropyl diacrylate, 2-hydroxypropyl dimethacrylate, 3-hydroxypropyl diacrylate or 3-hydroxypropyl dimethacrylate, 2-methoxyethyl acrylate, 2-methoxyethyl dimethacrylate, 2-ethoxyethyl acrylate or 2-ethoxyethyl dimethacrylate, 1,1,1-trimethylolpropane triacrylate or 1,1,1-trimethylolpropane trimethacrylate, pentaerythritol triacrylate or pentaerythritol trimethacrylate or mixtures thereof are used as component (a).

5. A process according to claim 1, wherein an epoxide resin having on average more than one group of the formula II

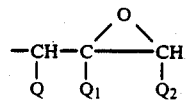

attached to an S, O or N atom, in which Q and $Q_2$ are each a hydrogen atom and $Q_1$ is a hydrogen atom or a methyl group, or Q and $Q_2$ together are $-CH_2CH_2-$ or $-CH_2-CH_2CH_2-$ and $Q_1$ is a hydrogen atom is used as component (b).

6. A process according to claim 1, wherein a diglycidyl ether, which can be so-called advanced, of 2,2-bis-(4-hydroxyphenyl)-propane, 2,2-bis-(3,5-dibromo-4- hydroxyphenyl)-propane, bis-(4-hydroxyphenyl)-methane, bis-(4-hydroxycyclohexyl)-methane or 2,2-bis-(4-hydroxycyclohexyl)-propane, a polyglycidyl ether of a novolak or tetraglycidylated 4,4'-diaminodiphenylmethane is used as component (b).

7. A process according to claim 1, wherein a diglycidyl ether, which can be so-called advanced, of bisphenol A, tetrabromobisphenol A or bisphenol F, a polyglycidyl ether of phenol-formaldehyde or cresol-formaldehyde novolaks or mixtures thereof are used as component (b).

8. A process according to claim 1, wherein dicyandiamide is used as the curing agent (c).

9. A process according to claim 1, wherein a compound of the formula III

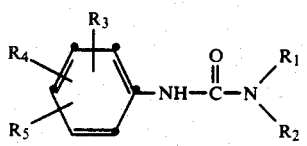

(III)

in which $R_1$ and $R_2$ independently of one another are alkyl having 1–4 C atoms, $R_3$ and $R_4$ independently of one another are a hydrogen or halogen atom, alkyl or alkoxy having 1–4 C atoms, phenyl or phenoxy and $R_5$ is a hydrogen atom or $-CF_3$ is used as the accelerator (d).

10. A process according to claim 1, wherein chlortoluron is used as the accelerator (d).

11. A process according to claim 1, wherein benzil dimethyl ketal is used as the photopolymerisation catalyst (e).

12. A process according to claim 1, wherein inorganic fillers, surface-active substances or elastomers are used as further additives (f), the sum of the components (a) to (f) being 100% by weight.

13. A process according to claim 1, wherein a mixture of substances containing 4–20% by weight of component (a), 30–90% by weight of component (b), 0.1–1.0% by weight of component (d) and 0.02–1.0% by weight of component (e) is used.

14. A process according to claim 1, wherein the resulting adhesive films are coated with a heat-curable epoxide resin system containing
 (i) an epoxide resin or mixture of epoxide resins which is dispersed, in a finely divided form, in
 (ii) a thermoplastic copolymer formed from an α-olefin and an ether or ester of an α-olefin, and
 (iii) a curing agent for the epoxide resin (i).

* * * * *